US007311869B2

(12) United States Patent
Espe et al.

(10) Patent No.: US 7,311,869 B2
(45) Date of Patent: Dec. 25, 2007

(54) METHOD FOR PROCESSING AND PRODUCING A SURFACE WITH A DEGREE OF LUSTRE

(75) Inventors: Rolf Espe, Bochum (DE); Oliver Espe, Bochum (DE)

(73) Assignee: Hueck Engraving GmbH & Co. KG, Viersen (DE)

( * ) Notice: Subject to any disclaimer, the term of this patent is extended or adjusted under 35 U.S.C. 154(b) by 726 days.

(21) Appl. No.: 10/486,855

(22) PCT Filed: Aug. 9, 2002

(86) PCT No.: PCT/DE02/02947

§ 371 (c)(1),
(2), (4) Date: Feb. 13, 2004

(87) PCT Pub. No.: WO03/016034

PCT Pub. Date: Feb. 27, 2003

(65) Prior Publication Data

US 2004/0239003 A1 Dec. 2, 2004

(30) Foreign Application Priority Data

Aug. 14, 2001 (DE) .......................... 201 13 503 U

(51) Int. Cl.
*B29C 59/02* (2006.01)

(52) U.S. Cl. ...................................... 264/284; 425/363

(58) Field of Classification Search ..................... None
See application file for complete search history.

(56) References Cited

U.S. PATENT DOCUMENTS 4,877,677 A * 10/1989 Hirochi et al. .............. 428/216
5,112,025 A * 5/1992 Nakayama et al. ......... 249/115
5,246,198 A * 9/1993 Kurihara .................. 249/114.1
5,855,641 A * 1/1999 Taniguchi .................... 65/286
6,523,803 B1 * 2/2003 Westmoreland .......... 249/114.1

FOREIGN PATENT DOCUMENTS

| | | |
|---|---|---|
| EP | 0 509 875 | 10/1992 |
| EP | 0 741 195 | 11/1996 |
| EP | 0 847 850 | 6/1998 |
| JP | 02-240201 | 9/1990 |
| JP | 06-218587 | 8/1994 |
| WO | WO99/47346 | 9/1999 |
| WO | WO 99/47346 | 9/1999 |

OTHER PUBLICATIONS

International Search Report, Dec. 2002.

* cited by examiner

*Primary Examiner*—Edmund H. Lee
(74) *Attorney, Agent, or Firm*—Collard & Roe, P.C.

(57) ABSTRACT

The invention relates to a method for processing and producing a surface of a material with a reproducible degree of lustre and to a press for carrying out said method. The aim of the invention is to increase the stability of the press. To achieve this, a press is provided with a coating that consists of carbon with diamond-like layers and that adheres to the surface of the press. Said coating has a layer thickness of between 0.1 and 10 μm and a surface hardness in excess of 1800 HV (Vickers). The attrition of the surface of the press is thus significantly reduced during the processing of abrasion-resistant materials.

19 Claims, 1 Drawing Sheet

METHOD FOR PROCESSING AND PRODUCING A SURFACE WITH A DEGREE OF LUSTRE

CROSS REFERENCE TO RELATED APPLICATIONS

Figure 1:
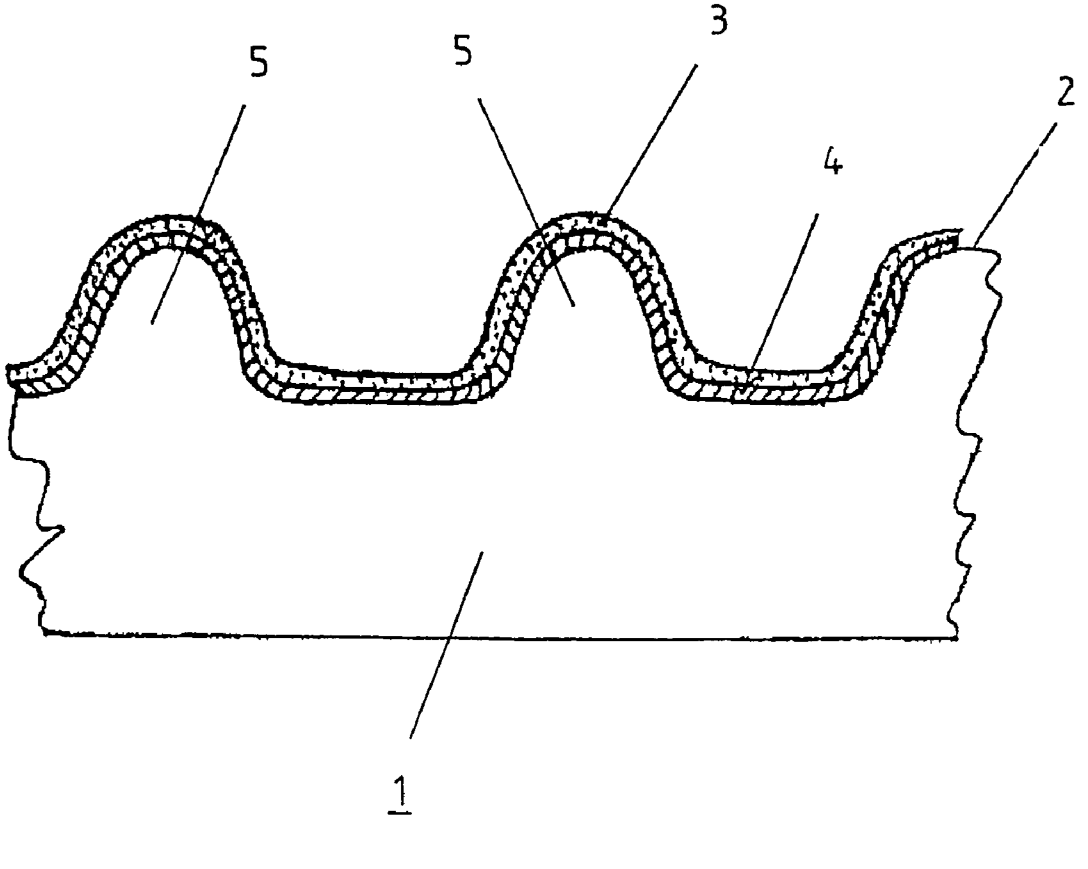

Applicants claim priority under 35 U.S.C. §119 of German Application No. 201 13 503.5 filed Aug. 14, 2001. Applicants also claim priority under 35 U.S.C. §365 of PCT/DE02/02947 filed Aug. 9, 2002. The international application under PCT article 21(2) was not published in English.

The invention relates to a method for producing an embossing on the surface of a work piece, having a reproducible degree of luster, as well as a pressing tool for using the method.

The method of the general type, i.e. the pressing tool required for it, is mainly used in the coating of board-type materials, particularly wood materials, having amino plastic resin films, for example. The coating on the board-type wood materials, which are also known as chipboards, MDF boards (medium density fiber boards), or HDF boards (high density fiber boards), is generally applied in hydraulic heated presses, under pressure and temperature, and needed in the furniture industry. Likewise, laminate boards are produced in the same manner. The surfaces to be processed can be produced to have a satin finish, a gloss finish, or a high-gloss finish and, in this connection, can be provided with a surface structure, if necessary. In order to protect the relatively expensive pressing tools from damage to the surface or premature friction wear, the pressing tools are preferably provided with a hard chrome layer, which can have a thickness up to 20 μm. In the coating of HDF boards having friction-resistant surfaces, which are used in the flooring sector, the pressing tools that have been on the market until now have a relatively short lifetime. After only 15,000 to maximally 25,000 pressing cycles, the pressing tools demonstrate a clear change in the degree of luster, despite of the existing hard chrome coating, so that the surfaces of the pressing sheets have to be refinished and chrome-plated. The great friction wear of the pressing tools is attributable to substances that are embedded in the surfaces to be processed. These are, for example, additives of corundum, i.e. aluminum oxide $Al_2O_3$, which are added to the surfaces in order to obtain the required friction wear values for floor boards. Since the required friction wear values are accordingly high (they can be up to 15,000 Taber revolutions MEMA Standard No. LD 1991 3.01 or up to 6,500 Taber revolutions according to the new standard pr EN '3329), the aforementioned substances are added to these surfaces as the finest possible particles. Because of its index of refraction of 1.57, $Al_2O_3$ combines particularly well with cellulose at 1.53 and melamine resin at 1.55, and achieves relatively transparent surfaces after curing of the melamine resins. Highly transparent surfaces are preferably aimed at since the overlay film has the function of protecting the melamine resin film, which lies underneath it and gives the décor, from destruction of the décor layer. The distribution of the $Al_2O_3$ particles in the overlay film can vary greatly, therefore there are also particles at the surface. In the coating of the HDF boards, relative movements occur in the press system, thereby causing the surface particles of the aluminum oxide to rub on the chrome layer and to bring about a change in the degree of luster of the pressing tool surfaces and thereby premature friction wear. Because of the existing admixtures, the friction wear resistance of the HDF floor boards is improved, but they demonstrate the aforementioned negative effect with regard to the chrome-plated pressing tools. Because of the great differences in hardness ($Al_2O_3$ possesses a Vickers hardness of 1,800 to 2,000 HV, while the chrome layer has only 900 to 1,000 HV), premature friction wear of the tool surface therefore occurs, and the useful lifetime is greatly reduced.

From the European patent EP A 0 509 875, for example, the production of a hard layer of a diamond-like pseudocarbon is known, whereby this coating is mainly intended for molds made of steel or aluminum, for the production of plastic parts. Other areas of use are indicated in the patent application, for example for machine construction, hydraulics, pneumatics, coating technologies, tool construction, and forming of plastics, as well as vacuum technology. Because this patent application deals exclusively with the production of the diamond-like pseudocarbon layer, however, no detailed exemplary embodiments or special purposes of use are disclosed.

The invention is therefore based on the task of indicating a method and a pressing tool for use of the method, with which the useful lifetime can be significantly increased.

Another task of the invention consists of increasing the chemical resistance of the pressing plate surface to phenolic resin monomers.

According to the invention, the task is accomplished by means of the use of a pressing tool having a coating on the pressing tool surface that consists of carbon with diamond-like layers, and that has a surface hardness according to Vickers of more than 1,800 HV. By means of the diamond-like layers of carbon as an additional coating, the surface hardness is significantly improved, so that the pressing tool used withstands greater stress, and no deterioration of the degree of luster is observed on the finished material. Such pressing tools are therefore very well suited for the processing of surfaces that are highly resistant to friction wear, which have been enriched, for example, with additives such as corundum, i.e. aluminum oxide $Al_2O_3$ or similar materials. In this connection, it might be necessary to make sure that the surface hardness of the materials to be processed lies below that of the coating of the pressing tool, in order not to provoke any deterioration of the useful lifetime. In the case of such a coating, it has been shown that the surfaces that contain $Al_2O_3$ that have been used cause hardly any friction wear on the pressing tool surfaces that are used, although a relative movement occurs between the material and the pressing tool during processing, which is responsible for friction wear of the pressing tool. Because of the use of the diamond-like layers made of carbon, the period of use of the pressing tools is therefore significantly increased, in surprising manner, and in addition, only an extremely slight change in the degree of luster of the processed material occurs, even at a large number of pressing cycles. In this connection, the processing of a surface material capable of flow takes place with the pressing tool, in order to form a smooth or structured surface, by means of plastification, shaping, and solidification within the pressing process. Preferably, the pressing tools are used for the processing of large-format flat surfaces and of one-layer or multi-layer materials, particularly plastic materials, sheet-like wood materials, laminates with or without overlay papers or overlay films. For plastification of the materials to be processed, heating of the pressing tool takes place in a low temperature range, which clearly lies below the recrystallization threshold of the pressing tool materials being used, and goes up to the melting point of the plastics, plastic coatings, or overlay films being used. Therefore deformation of the surfaces to be processed can take place in a low temperature range, without any detrimental effect on the basic materials of the pressing tool, which deformation is connected with a final hardening of the surface.

Preferably, in this connection, duroplastic films or coatings are used for processing, which are first plasticized by means of the heating that takes place, thereby causing liquefaction of the duroplastics that have not hardened yet, and spatial structures are generated by means of the pressing process and the subsequent polycondensation, which structures correspond to the desired surface structure of the pressing tool. After shaping and subsequent polycondensation of the duroplastics being used has taken place, solidification occurs, which results in the desired resistant surface of the materials. Surprisingly, it has been shown, in this connection, that the useful lifetime of the pressing sheets is significantly increased as compared with the technology used previously.

In order to use the method, a pressing tool for flat surfaces, in the form of a pressing sheet, an endless belt, or a pressing roller is provided, which is provided with a work piece for pressing a surface material capable of flow, whereby the pressing tool surface is structured to be firmly adhering and has a layer thickness of 0.1 to 10 μm and a surface hardness according to Vickers of more than 1,800 HV, so that the pressing tools are provided with a protective layer that is highly resistant to friction wear, and thereby premature friction wear is prevented in the coating process of HDF boards having overlay films containing $Al_2O_3$, for example, even in the case of a constantly recurring relative movement between the pressing tool surface and the surface to be processed. In this connection, the pressing tools are provided with a firmly adhering coating that is highly resistant to friction wear, made of carbon with diamond-like layers, for example, after the known surface pretreatments, such as tolerance grinding, polishing, structuring, and matte-finishing. In the case of such a coating, it has surprisingly been shown that the overlay films that contain $Al_2O_3$ that are used generate practically no friction wear on the press sheet surfaces that are used, and that therefore the period of use, i.e. the useful lifetime of the pressing sheets or pressing tools is significantly increased. This coating, which contains carbon with diamond-like layers, can be applied to the surfaces in a plasma-activated deposition process from the gas phase (chemical vapor deposition), at relatively low temperatures below 20° C. The deposition process takes place in a high-vacuum apparatus, whereby gaseous hydrocarbons are introduced all the way into the high-vacuum region, after evacuation. In order to improve the adhesion of the diamond-like layers of carbon on the tool surface, the latter can first be chrome-plated.

For the formation of the layer, it is necessary to apply an electrical bias voltage (direct voltage or alternating voltage) to the pressing tool or pressing sheet, up to several kV, preferably 100 to 800 volts. In this connection, the pressing sheet is arranged on an electrode in the vacuum apparatus. Furthermore, it is necessary for the formation of the layers that the hydrocarbon gases used form carbon, on the one hand, and energy-rich ions, on the other hand, after having been split in the plasma.

It is recommended to perform the deposition in a high-frequency field, in order to deposit thicker layers, for one thing, and to guarantee reproducibility of the process, for another thing.

Furthermore, for better adhesion of the coating, the pressing sheet should first be etched. This preferably takes place in the same apparatus in which the coating is also deposited.

Etching is performed by means of cathode atomization by means of noble gas, whereby argon is advantageous, for example. Introduction of the noble gas is interrupted as soon as the gases that are responsible for the coating (hydrocarbons) are introduced.

In order to further improve the adhesion ability on the pressing sheet surface, an intermediate layer of silicon, silicon dioxide, titanium oxicarbide can be applied according to the known methods, for example by means of cathode atomization.

It has also proven to be an advantage that the adhesion ability of the coating is increased by prior chrome plating of the pressing sheet surface. Stainless steel sheets having a high proportion of chrome can also be coated with diamond-like layers of carbon, without prior additional chrome plating. It is important in this connection that the metals used are good carbide-forming agents. Stainless steels with high nickel proportions are therefore more difficult to coat, here it is recommended to apply the intermediate layers recommended above.

The deposition at relatively low temperatures has also proven to be an advantage, since the metal structure or the metal lattice is not influenced, for example in the case of stainless steel in the following exemplary embodiment, because the coating temperature clearly lies below the recrystallization threshold for steels. Furthermore, warping of the pressing sheets, as it usually occurs at higher temperatures, is prevented.

An example for applying a coating with a surface of the pressing tool that is highly resistant to friction wear is provided, according to the invention, in that a steel sheet of the material No. DIN 1.4006 or ASI 410 is first ground to tolerance on both sides, in order to produce the plane parallelity that is required, then is fine-ground and polished, in order to prepare the sheet metal for the subsequent structuring process. Afterwards, an etch reserve is applied by means of roller printing, screen printing, or direct application of a photoresist layer. The pressing sheet prepared in this way is then structured according to the known etching methods (electrolytic machining, electrolytic material removal, conventional etching with acids, etc.). The degree of luster is subsequently produced by means of glass beads or other blasting media, using the blowing method. Afterwards, the pressing sheet is covered with a chrome layer, in a chrome-plating bath. In the present case, the chrome layer thickness was approximately 20 μm. Now, a coating of carbon with diamond-like layers and a layer thickness of approximately 2.5 μm was applied in a high vacuum. The deposition takes place according to the method described above, from the gas phase (hydrocarbon), in a plasma-activated deposition process. An appropriate bias voltage of 100 V alternating voltage, for example, with a frequency of 25-30 MHz, is applied to the pressing sheet. After a high vacuum was produced, an etching process by means of cathode atomization with argon gas, for example, at a pressure of 0.03-0.06 Pa, first takes place for better promotion of adhesion. Afterwards, the hydrocarbon gas needed for the coating process, for example ethylene, is introduced into the apparatus, and at the same time, the feed of argon is shut off. The gas pressure of the ethylene gas was 1.0-1.5 Pa.

A pressing sheet having a coating made of carbon with diamond-like layers was achieved, whereby the surface hardness was approximately 3,000 HV. With this, the coating is clearly above the value, in terms of hardness, of the aluminum oxide that is used in the overlay films, and clearly lower friction wear values were obtained in comparison with pressing sheet surfaces that were only chrome-plated.

The invention will be explained once again, using the single FIGURE. The FIGURE shows a pressing tool 1 having a pressing tool surface 2 made of chromium steel DIN 1.4006 or ANSI 410 1, with a coating 3 made of carbon with diamond-like layers, and a chrome layer 4 as an intermediate layer, which has a wood pore structure 5.

The pressing tools 1 are preferably used in the production of plastic-coated wood material or laminate boards, which are used in the production of furniture, for example. For surface structuring, the pressing tools 1 can have a structure 5 embossed into their surface. Embossing of such a structure 5 into the materials to be processed takes place using the pressing tools 1, in the form of large-format pressing sheets or endless belts. The pressing tools 1 consist either of a steel or brass sheet having a surface structuring, or of a steel plate coated with copper or brass, whereby the surface structuring is worked into the additional coating, which is subsequently provided with a hard chrome-plating, if necessary, and receives a coating 3 according to the invention. Such pressing tools 1 are installed into a pressing device, with which the plastic-coated furniture construction boards, laminates, or the like are produced. In order to achieve continuous production, presses having two endless belts that run continuously are also known, between which the pressed goods are pressed to produce boards. In both embodiments, the surfaces facing the pressed goods can have a structure 5 that is embossed into the pressed laminate. To the extent that laminates or overlay films are used, which are provided with particles resistant to friction wear, for example corundum, i.e. aluminum oxide $Al_2O_3$, the embodiment according to the invention of a pressing tool 1 having a coating 3 made of carbon with diamond-like layers is used, which coating is additionally applied to the existing structured surface. The particular advantage is that because of the existing hardness, a significantly greater resistance to friction wear is present, as compared with the surfaces to be processed, and thereby the useful lifetime is increased.

Reference Symbol List

1 pressing tool
2 pressing tool surface
3 coating
4 chrome layer
5 wood pore structure

The invention claimed is:

1. A method for producing an embossing on a surface of a workpiece, the method comprising the step of pressing a flowable surface material together with the workpiece using a pressing tool, the pressing tool having a having a coating of diamond-like carbon layers disposed on a pressing tool surface, the coating having a Vickers surface hardness greater than 1,800 HV.

2. The method according to claim 1, wherein the flowable surface material comprises a material to which corundum has been added to produce a surface that is highly resistant to friction wear, and wherein the flowable surface material has a surface hardness below that of the coating.

3. The method according to claim 1, further comprising the step of forming a smooth or structured surface on the workpiece by means of plastification, shaping and solidification.

4. The method according to claim 1, wherein the workpiece comprises a single layer or multi-layer material and the flowable surface material comprises a plastic material or an overlay paper.

5. The method according to claim 4 further comprising the step of heating the pressing tool in a low temperature range, the low temperature range being below the recrystallization temperature of the pressing tool materials and up to the melting point of the plastic material or overlay paper.

6. The method according to claim 1, wherein the surface of the workpiece comprises a large-format flat surface.

7. The method according to claim 1, wherein the flowable surface material comprises a duroplastic material.

8. A pressing tool for producing an embossing on a surface of a workpiece by pressing a flowable surface material together with the workpiece, said pressing tool comprising a pressing sheet, an endless belt or a pressing roller and having a firmly adhering hardened coating of diamond-like carbon layers disposed on a pressing tool surface, said coating having a layer thickness of 0.1 to 10 μm and a Vickers surface hardness greater than 1,800 HV.

9. The pressing tool according to claim 8, wherein said coating comprises amorphous carbon.

10. The pressing tool according to claim 8, wherein said pressing tool surface comprises a smooth surface.

11. The pressing tool according to claim 8, wherein said pressing tool surface comprises a structured surface.

12. The pressing tool according to claim 8, wherein said pressing tool comprises a steel material.

13. The pressing tool according to claim 12, wherein said steel material comprises a stainless steel material.

14. The pressing tool according to claim 8, wherein said pressing tool comprises a brass material.

15. The pressing tool according to claim 8, wherein said pressing tool surface is etched with a noble gas using a cathode atomization process before applying said coating of diamond-like carbon layers.

16. The pressing tool according to claim 8, further comprising an intermediate layer of chrome disposed between said pressing tool surface and said coating of diamond-like carbon layers.

17. The pressing tool according to claim 8, further comprising an intermediate layer of silcon, silicon dioxide or titanum oxicarbide disposed between said pressing tool surface and said coating of diamond-like carbon layers.

18. The pressing tool according to claim 8, further comprising an intermediate layer of titanium nitrite disposed between said pressing tool surface and said coating of diamond-like carbon layers, said titanium nitrite being deposited in a high vacuum using a plasma arc.

19. The pressing tool according to claim 8, wherein said coating of diamond-like carbon layers is applied using a plasma-activated deposition process from a gas phase (chemical vapor deposition) at a low temperature below 200° C. in a high vacuum.

* * * * *